Figure 7:
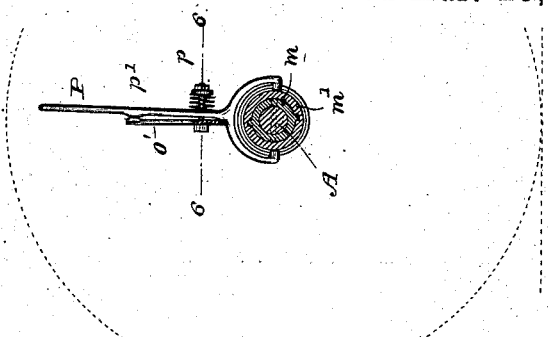

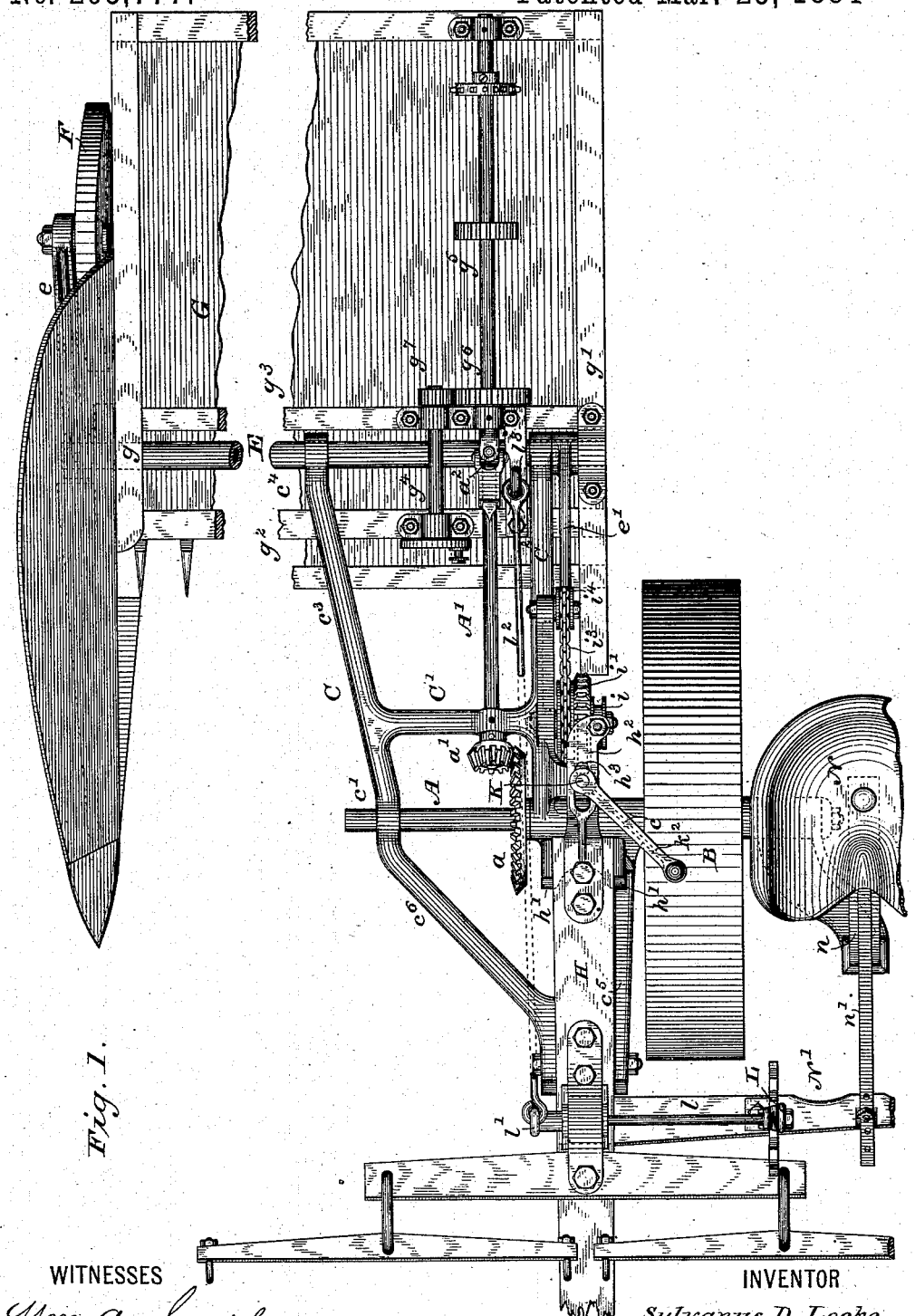

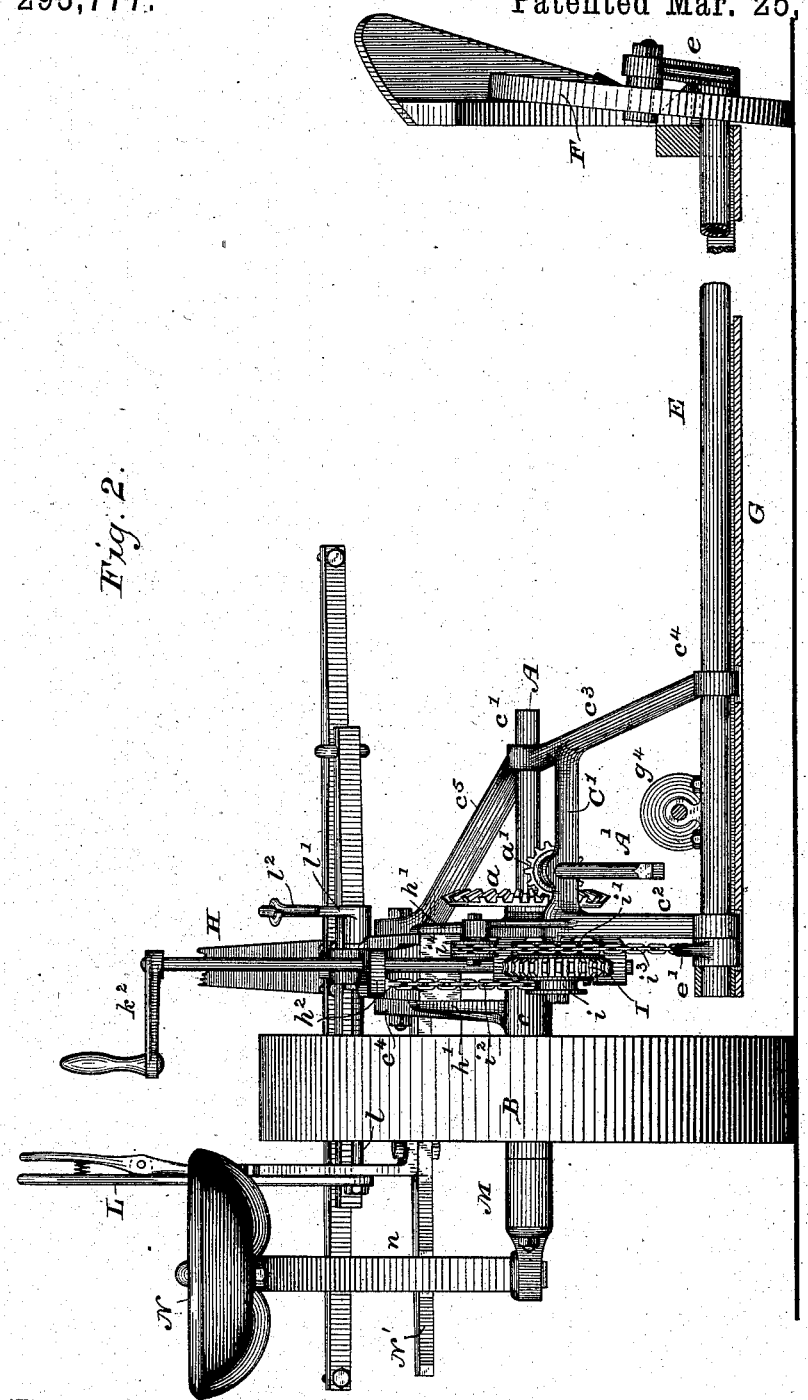

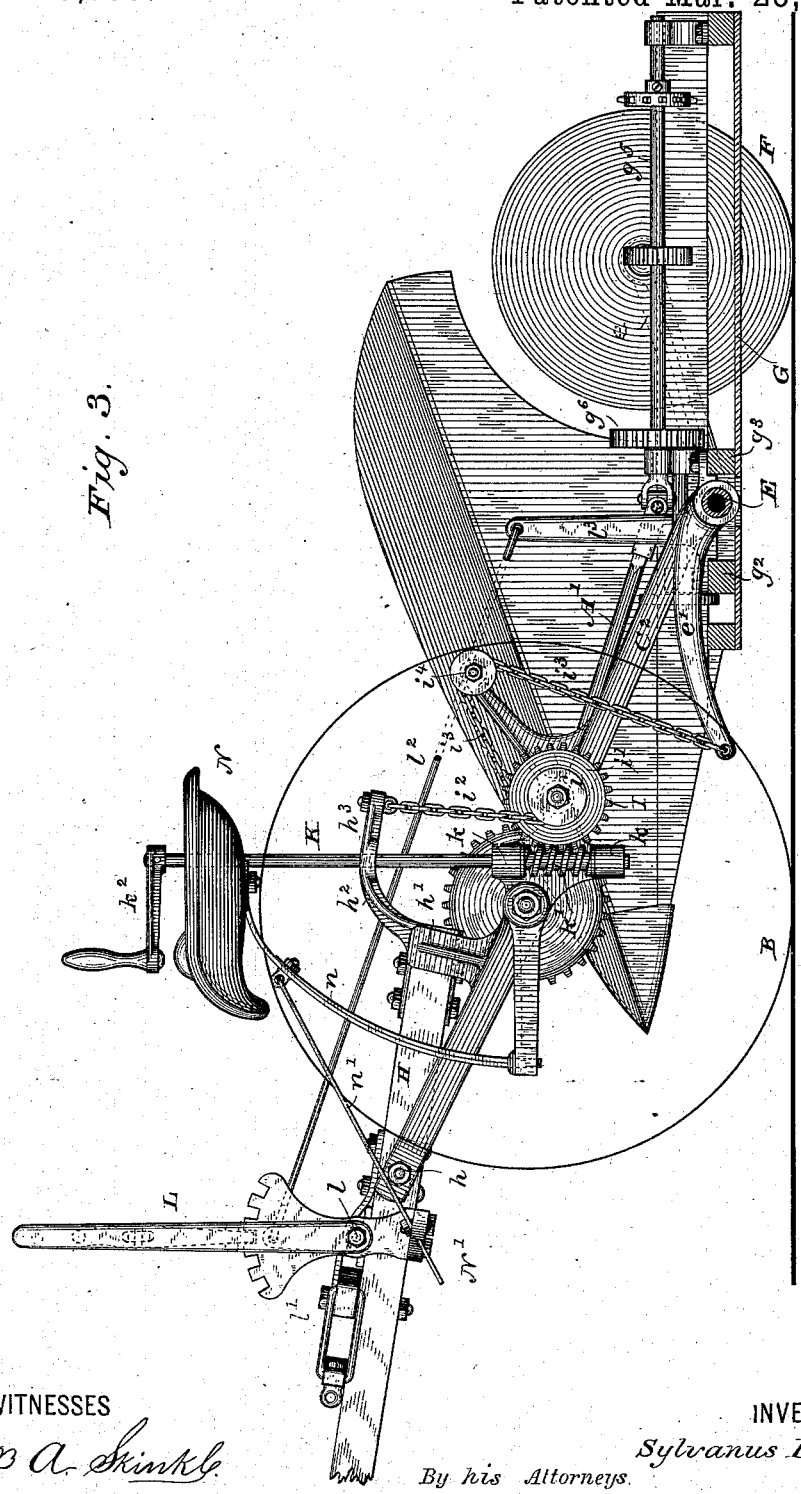

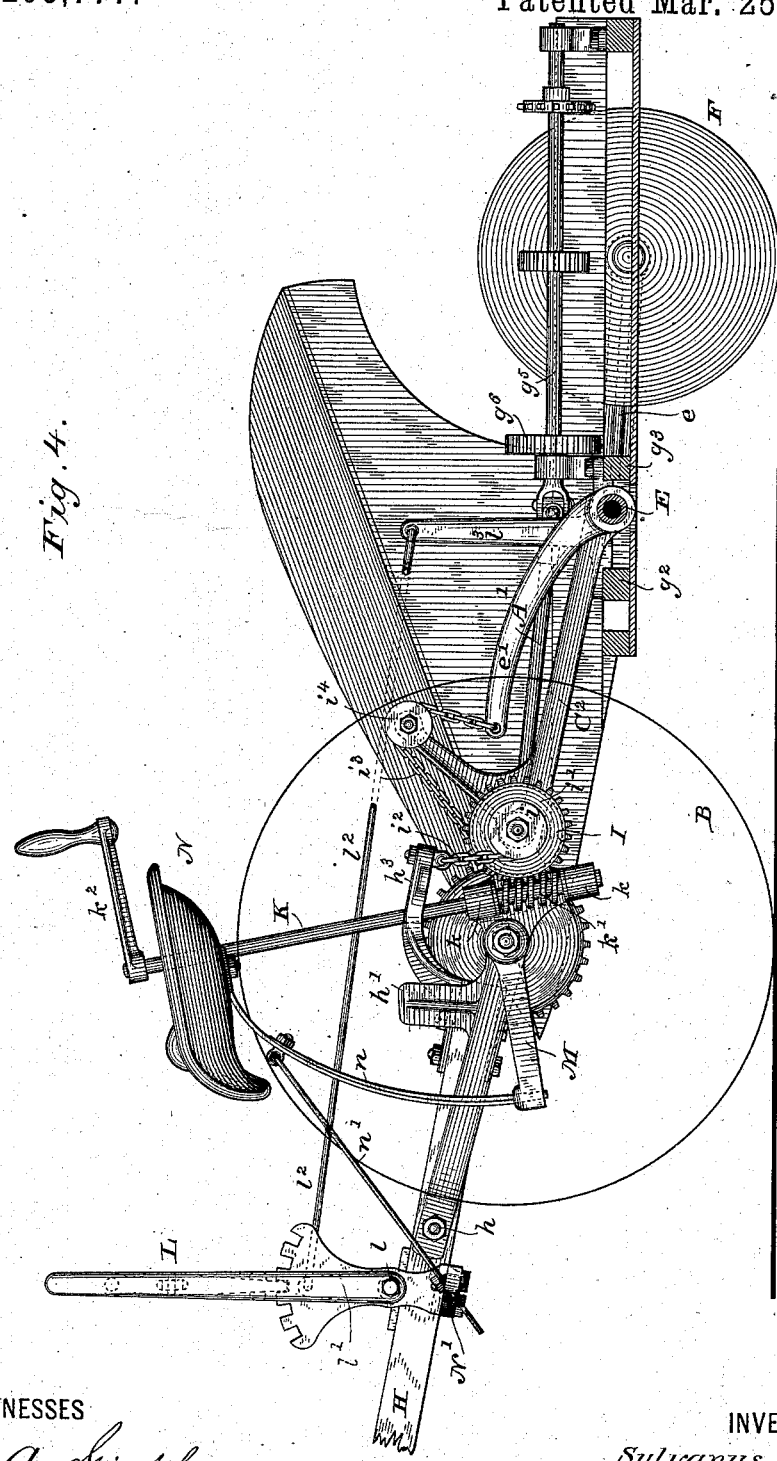

(No Model.)

S. D. LOCKE.
HARVESTER.

No. 295,777. Patented Mar. 25, 1884.

WITNESSES
Wm. A. Skinkle
Edwin A. Newman

INVENTOR
Sylvanus D. Locke
By his Attorneys

UNITED STATES PATENT OFFICE.

SYLVANUS D. LOCKE, OF HOOSICK FALLS, NEW YORK.

HARVESTER.

SPECIFICATION forming part of Letters Patent No. 295,777, dated March 25, 1884.

Application filed April 3, 1883. (No model.)

*To all whom it may concern:*

Be it known that I, SYLVANUS D. LOCKE, of Hoosick Falls, in the county of Rensselaer and State of New York, have invented certain new and useful Improvements in Harvesters, of which the following is a specification.

My purpose is to improve and simplify the organization and construction of single-wheel rear-cut harvesters having a platform, although practically all the features of my invention are applicable to single-wheel rear-cut harvesters generally, including mowers; and the invention consists in combining, with the main axle and drive or carrying wheel turning thereon, a main or wheel frame inside of said wheel, a rock-shaft turning in bearings afforded by the rear end of said frame, a platform mounted upon said rock-shaft as a journal or axle, an arm extending rearwardly from said rock-shaft at its outer end and supporting the grain-wheel, a second arm extending forwardly from said rock-shaft toward its inner end, and a chain or equivalent connection between said second or lever arm, and adjusting mechanism upon the wheel-frame, whereby the rock-shaft may be oscillated to raise and lower the harvester-platform; in combining, with the main axle and drive or carrying wheel turning thereon, a main or wheel frame mounted upon the axle, a rock-shaft journaled in the rear end of the main frame and supporting the platform, a grain wheel or caster carried by a rearward-extending arm at the outer end of said rock-shaft, a forwardly-extending lever-arm at or toward the inner end of said shaft, a draft-tongue hinged to the front of the main frame and extending rearward from the pivotal point, a bracket-casting or other means of attachment on the heel of said draft-tongue, chains extending from said bracket and from said lever-arm to properly-proportioned pulleys upon the main frame, and means for rotating said pulleys to wind up or let out the chains, and thereby raise or lower the harvester-platform; in combining, with the main axle and drive or carrying wheel mounted thereon, a main or wheel frame mounted upon the axle, a platform hinged to the main frame at its rear end, a draft-tongue hinged to said frame at its front end in advance of its connection with the axle, means for simultaneously changing the angle between draft-tongue and main frame and platform and main frame, to raise and lower said platform, a seat and its support sleeved to the axle outside of the drive-wheel, and a brace-rod extending from said seat to an adjustable connection with the tongue; in combining, with the main axle and drive or carrying wheel mounted thereon, a main frame mounted upon the axle, a rock-shaft borne in bearings at the rear end of the main frame, a grain-wheel mounted upon a rearwardly-extending arm from the outer end of said rock-shaft, a forwardly-extending arm at or toward the inner end of said rock-shaft, a draft-tongue pivoted to said main frame in advance of the axle, and extending rearwardly between guide-ears, which permit it to play in a vertical plane, and connections between the heel end of said draft-tongue, the free end of the lever-arm, and a common controlling instrumentality, by which the draft-tongue can be vibrated upon its pivot and the rock-shaft simultaneously oscillated in its bearings, to change the angle between the draft-tongue and frame and the platform and frame, and raise and lower said platform; in combining, with the main axle and drive or carrying wheel mounted thereon, a main frame mounted upon the axle, a rock-shaft mounted in bearings at the rear end of the frame, and having at its outer end a rearwardly-extending arm to support the grain wheel or caster, and at its inner end a forwardly-extending lever-arm, a platform supported upon said rock-shaft as a journal or axle, a tongue hinged to the main frame in advance of its connection with the main axle, and extending rearwardly from said pivot to vertical guides or keepers between which its heel end plays, a bracket-casting secured to said heel end, a worm-shaft extending down from about the height of the seat and turning in bearings upon the main frame, a crank at the end of said shaft, to be operated by the driver, a worm-pinion meshing with the worm at the lower end of said shaft and turning on a stub-axle projecting from the main frame, and properly-proportioned winding-drums fixed to said pinion to turn therewith, one receiving a chain from the bracket-arm at the rear of the tongue, and the other a chain from the lever-arm extending forwardly from the rock-shaft, whereby the driver may adjust the platform and simultaneously the draft-tongue by turning the worm-shaft; in combining, with the main axle and drive or carrying wheel turning on said axle, a main frame sleeved upon the axle inside of the drive-wheel and supporting it against lateral displacement on that side, a sleeve pinned to the axle on the outer side and abutting against the hub of the carrying-wheel on that side to prevent its lateral displacement in such direction, and a sliding clutch-half feathered to said sleeve and engaging with the clutch-face formed in the opposing hub; in combining, with the main axle and a drive or carrying wheel turning thereon a main frame sleeved upon the axle on the inner side of said wheel and abutting against its hub on that side, a sleeve pinned to the axle on the outer side of the wheel, and also abutting against the hub on that side, whereby the axle is steadied against lateral displacement, a seat-support mounted upon the axle outside of said sleeve, and a seat carried thereon and braced from the draft-tongue, a sliding clutch-half feathered to the sleeve inside of the seat-support, and engaging with a clutch-face formed in the opposing wheel-hubs, a standard projecting from the seat-support and formed with a catch, and a clutch-lever pivoted to said standard to throw the clutch-half in and out of engagement; in combining with the axle a drive or carrying wheel mounted thereon, a main frame mounted upon the axle, a clutch between said wheel and axle, a bevel-gear wheel upon the axle at a suitable point within the main wheel and constituting the main gear of the harvester, a rearwardly-extending shaft meshing by bevel-pinion with said gear-wheel and having its bearings in the main frame, a rock-shaft journaled in the rear end of the main frame parallel with the axle, and supporting, by means of a rearwardly-extending arm at its outer end, the grain-wheel, and connected by a lever-arm extending forwardly from its inner end or length with means whereby it can be oscillated, a platform journaled upon said rock-shaft, a shaft journaled in said platform and forming a practical continuation of that driven from the bevel-wheel, a universal joint and telescoping connection between said two shafts above or near the rock-shaft supporting the platform, a gear-wheel upon the platform-shaft, and a cutter crank-shaft parallel with said platform-shaft, and having a pinion which intermeshes with its gear-wheel; in a novel main frame formed in one piece of peculiar outline, and in the various combinations and details of construction hereinafter pointed out and claimed.

Figure 6:
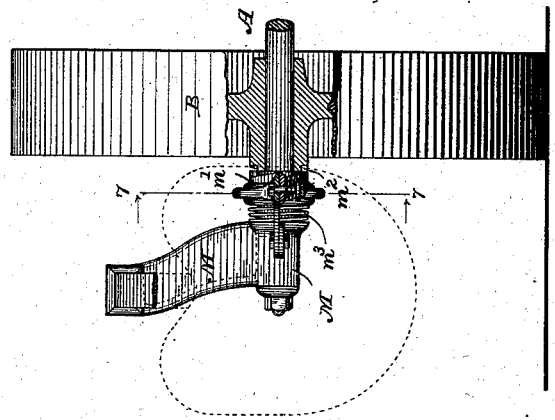
Figure 5:
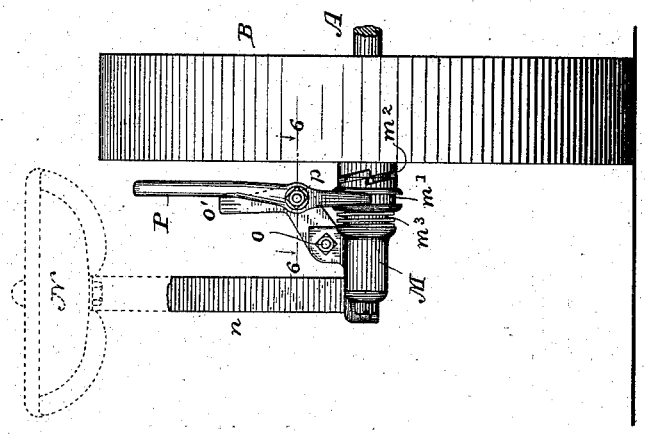

In the drawings, Figure 1 is a top plan view of a harvester embodying my invention. Fig. 2 is a rear elevation thereof; Fig. 3, an elevation, partly in section from the stubble end, with the platform depressed; Fig. 4, a like elevation with the platform raised; Figs. 5, 6, and 7, details of the clutch between the main wheel and the axle.

A is the main axle, and B is the drive or carrying wheel mounted thereon. This, so far as regards the general organization of the machine about to be described, may be either keyed to the axle, so that they will turn together as if integral, in which case there will be a clutch between the axle and the main gear, so that the mechanism shall not be unnecessarily driven, or it may be, and preferably is, united therewith by a clutch, advisably a backing-ratchet or one-way clutch, which can be thrown in and out of action at pleasure. It may even be found feasible and practicable to fix the axle to the frame, hereinafter described, and drive the active parts of the mechanism by a main gear on the inner side of the wheel, either riveted thereto or clutched thereto. The organization set forth below is, however, the best so far as known to me.

C is the main frame, cast in one piece, having one long sleeve, $c$, which embraces the axle close to and abuts against the inner hub of the wheel, and a second sleeve or bearing, $c'$, at some distance from the former, in which rests the grain end of the axle, that a broad and firm support may be afforded. From the first sleeve an arm, $c^2$, extends directly back close to and alongside the wheel, at right angles, or nearly so, to the axle, and from the second another arm, $c^3$, extends diagonally back as a trace. Both arms terminate in bearings $c^4$, in which rests and oscillates a rock-shaft, E, parallel with the axle and of such length as to extend entirely underneath the platform and project somewhat beyond at the grain or divider end, where it has a rearwardly-extending arm, $e$, supporting the grain-wheel F, and either entirely rigid with the shaft, and the grain-wheel turning, as deemed advisable, upon a fixed pivot at its end, or swiveled thereto, to act as a caster, or else itself swiveled to the end of the rock-shaft, as with some of the supporting-bars already in use, which are swiveled to the frame-work. At or toward the inner end—depending on the length and character of the machine—the rock-shaft has a lever-arm extending forwardly toward the main axle, by which arm it may be oscillated in its bearings, to press the outer arm upon the grain-wheel and force it down, thereby tending to lift said shaft and whatever it supports, or to release said arm and permit the wheel to rise to lower the shaft.

The platform G is mounted upon the rock-shaft in such manner as to have two, and preferably three, bearings upon it—the first beneath the divider-girt $g$, one in a cross piece or timber, $g'$, constituting the delivery end of said platform when there is no elevator, but lying centrally under the foot of the elevator when one is used, and the third under the stubble-girt of the frame, in case there is an elevator. As thus arranged the rock-shaft will be a slight distance behind the front sill or finger-bar, $g^2$, of the harvester, and behind the shaft there will be another longitudinal sill, $g^3$, to support bearings for the rear end of the cutter crank-shaft $g^4$, and for the front end of the main shaft $g^5$, borne in the platform-frame, the front end of the cutter-shaft having its bearing in or upon the front sill, and the rear end of the main shaft having its bearing in or upon the rear sill, the two shafts inter meshing by means of gear $g^6$ and pinion $g^7$, as shown. Upon the main shaft is a beveled gear-wheel, $a$, constituting the main gear of the harvester, located just inside of and abutting against the inner end of the long sleeve of the frame. It meshes with and drives a beveled pinion, $a'$—the prime pinion—upon the adjacent end of a shaft, A', which turns in a bearing in a cross-piece, C', uniting the two rearwardly-extending arms of the main frame, and extends rearwardly, parallel with the first or straight arm of said frame, to a point above the cranked shaft supporting the platform, where it meets the front end of the platform-shaft or main shaft, and is united thereto by a universal joint, $a^2$, to allow for the flexion or hinging of the platform upon the rock-shaft either when it is being tipped, or when it is being raised and lowered. A telescoping joint is also made in this shaft A', to further compensate for the flexion. In front of the axle the frame has an arm, $c^5$, extending directly forward from the inner or long sleeve, and a second arm, $c^6$, inclining inward from the outer sleeve or bearing as a hound until the two meet on each side of the draft-tongue H, which they embrace and secure by means of a through pivot-bolt, $h$, at some distance in advance of its rear end, the latter being steadied and held against lateral movement by means of vertical guides or keepers $h'$, one of which projects from the sleeve on the axle, and the other rises from the arm.

There may be said to be but three stationary points in a harvester. The first is at the contact of its main or carrying wheel or wheels with the ground, the second at the like contact of the outer or grain wheel, and the third the connection of the tongue with the yoke beneath the horse's neck. If, therefore, there is an adjustment between two of these, there will be a relative derangement between one of them and the third unless an adjustment also takes place there.

In the present machine, if the platform should be changed in its angle to the main frame without any flexion between the draft-tongue and frame, either the front of the tongue would be thrown up, or else it would be depressed, bringing greater weight on the necks of the horses—that is, if the change was a positive one—or else, the tongue remaining at rest in the yoke, the platform would be tipped, not raised vertically throughout its extent. Therefore some means must be adopted whereby, whenever it is desired to raise or lower the platform without disturbing its horizontal adjustment, the draft-tongue shall also be flexed upon its hinge. The platform is raised and lowered by the oscillation of the rock-shaft supporting the grain-wheel by means of the lever-arm at its inner end, and the adoption of any suitable means acting upon this lever-arm and upon the rear end of the tongue, to move them or release them the proper relative distance, will be sufficient for my purpose. For instance, a T-lever might be employed, its arms being of unequal length, according to the relation between the draft-tongue and the lever-arm from the rock-shaft, one of these arms being connected by a link with the heel of the draft-tongue or a bracket projecting therefrom, and the second by another link with the free end of the arm from the rock-shaft. Thus by rocking the T-lever the draft-tongue would be flexed upon its pivot and the rock-shaft oscillated the proper relative distance, so as to raise the platform and to commensurately alter the angle of the draft-tongue to the frame; but as it is intended that the platform shall be capable of following the inequalities of the ground, these rigid link-connections would be to some extent objectionable, since they would prevent this desirable freedom of action. Therefore chain or other flexible connections would be preferable, since they would render the adjustment rigid in one direction—that is, they would prevent that adjustment being overstepped, but would allow freedom of movement in the other direction. The better plan has seemed to me to mount upon the frame a worm-pinion, I, turning upon a stub-axle offsetting from the straight rearward arm of the frame. To this worm-pinion are secured two winding-drums, $i$ and $i'$. The first is the smaller, and receives a chain, $i^2$, from the bracket-arm $h^2$, bolted to the heel of the draft-tongue and extending rearwardly therefrom, so as to overhang the sleeve or drum. The second is larger, and upon it is wound a chain, $i^3$, from the inner lever-arm of the rock-shaft, which, to give greater sweep to that arm, is carried on its way to the sheave over an idle or guide pulley, $i^4$, supported upon a short standard from the frame bar or arm. A vertical worm-shaft, K, turns in bearings $k$, projecting in the form of ears or lugs from a web-extension of the frame-bar immediately behind the axle, and receives between these bearings a worm, $k'$, which meshes with the worm-wheel to drive it. At the top of the shaft, which rises somewhat above the level of the seat, it has a crank, $k^2$, by which the driver may control it. A slight distance above its upper bearing it may, though not necessarily, pass through a longitudinal slot, $h^3$, in the bracket from the heel of the draft-tongue, such slot allowing the play of the bracket and tongue sufficiently for all necessary adjustment of the harvester, but serving, in connection with the shaft, to prevent their going beyond the proper range. Now, supposing the worm-shaft to be turned by the driver in a direction calculated to wind the chains upon their sheaves, the lever-arm from the rock-shaft will be raised, depressing the grain-wheel and lifting the platform, bringing it more and more in line with the main frame, and at the same time the rear end of the draft-tongue will be depressed, bringing it also more and more in line with the frame; but if the worm-shaft is turned in the contrary direction the weight of the platform will carry it down as far as permitted by the chain let out from its sheave, and the weight of the longer arm of the draft-tongue—the arm resting in the neck-yoke—will carry that also down, raising the heel end and taking up the chain connected therewith as it is let out. Thus the angle between draft-tongue and frame and platform and frame will be simultaneously changed to the extent permitted by the chains and their common controlling device, but to no further extent, while within that limit they will be permitted to lessen the angle by flexions demanded by the exigencies of the field.

It has been understood, of course, that there is to be some controlling device other than that already described for raising and lowering the platform, whereby the platform may be tipped upon the rock-shaft which supports it, and may be held in the tipping adjustment while independently adjusted by the raising and lowering mechanism. Without this, and merely mounted by journaled bearings upon the rock-shaft, as thus far described, it would retain no position whatever. It would simply tilt or sink until it found the ground, and then rest upon that and be dragged along. This tilting device may be of any suitable nature. It may be between the platform and the main frame. I prefer, however, to accomplish it by connections between the platform and a lever mounted upon the draft-tongue close to the pivot of the latter, where it will not be disturbed by any flexions of such tongue, will be practically as stationary in position as if on the main frame itself, and will be more convenient to the driver's hand or foot. L is this lever. It is fast to the stubble end of the short rock-shaft $l$, supported in suitable bearings, and extending transversely of the draft-tongue, immediately above the pivot of the latter, to its inner side, where it has a short lateral arm or crank, $l'$, connected by a rigid link, $l^2$, with a standard, $l^3$, bolted to the platform-frame at the front inner corner thereof, and preferably immediately above the supporting rock-shaft. Where, however, any portion of the platform or any parts borne by it rise to a suitable distance above the rock-shaft—as in the common harvester portions of the elevator rise above—then the link $l^2$ may be attached thereto, instead of to a standard raised purposely therefor. A segment-rack, $l^4$, will be secured in position to receive a dog from the lever controlled by a hand-piece alongside the hand-hold thereof, so that by moving the lever back and forth and locking it in position along the rack the platform may be tipped and held in any desired tipping adjustment, independently of the raising and lowering instrumentalities, which may be brought into action without disturbing such adjustment, and when so actuated will raise and lower the harvester-platform in parallelism with it.

It only remains to describe the method by which the drive-wheel is steadied against lateral displacement on the axle, the construction of the clutching devices for securing it to said axle, and the manner in which the seat is supported upon the outer end of the axle beyond these clutching devices. As already stated, the long sleeve on the main frame abuts against the inner hub of the drive-wheel and secures it against displacement in that direction. When it has been brought up against this sleeve and is steadied thereby, a short tube or ferrule, $m$, is slipped on the outer end of the axle until it abuts against the outer hub, and is then fixed permanently in position—as by a pin passing through it—and the axle thus firmly securing the wheel against escape or movement laterally. The tube or ferrule $m$ is provided with external splines or feathers, which take into grooves in a sliding clutch-half, $m'$, that is now placed over it. A clutch-face, $m^2$, is formed in the hub above the line of the periphery of said tube, to receive the teeth of this clutch-half, and the latter is urged forward by a spring, $m^3$, which tends constantly to force it into engagement. Outside of the ferrule the seat-support M is sleeved upon the axle and secured against escape by a collar. From this support a spring-standard, $n$, rises to the seat N above, and from the standard a brace-rod, $n'$, extends to a foot-rest, N', projecting laterally from a point on the draft-tongue, close to the pivot of said tongue. By means of a bolt and series of perforations this brace-rod is adjusted to throw the seat farther back or forward, to alter the balance when necessary, since the arrangement described is such that the seat will be practically unaffected in position by flexions of the tongue and main frame, and hence does not need adjustment or a compensating connection merely on account of such flexions.

Upon the seat-support sleeve are ears $o$, in which is clasped a vertical standard, $o'$, having an inclined face at its upper end, terminating abruptly at the inner edge of said standard. The clutch-lever P is pivoted to the standard by means of a bolt, $p$, which has a spring-seat, that said lever may yield laterally whenever, for the purpose of throwing the clutch out of engagement, its handle end is pushed toward the main wheel, to enable a projection or lug, $p'$, from its shank opposite the inclined face of the standard to ride up said incline and shut in behind the inner edge, whereby the clutch will be locked out of engagement, or that the lever may be forcibly sprung out to break the lock between its projecting lug and the standard and permit it to return past said standard to its free position, while the clutch is restored to engagement by its spring seated between itself and a flange on the seat-support, or in said motion of the lever positively caused. The harvester is thus brought under the ready control of the driver, who from his seat can stop and start the mechanism by throwing the clutch-lever out or in, can raise and lower the platform by turning the worm-shaft, when it will be held in its adjusted position by the friction between the worm and its pinion, or by a pawl and ratchet dogging said shaft, and can tilt it to change the inclination of the cutters to the ground through the instrumentality of the tipping lever.

I claim—

1. The combination, substantially as hereinbefore set forth, of the main axle, the driving or carrying wheel thereon, the main or wheel frame mounted on the axle, a rock-shaft turning in bearings afforded by the rear end of said frame, a platform mounted upon said rock-shaft as a journal or axle, an arm extending rearward from said rock-shaft at its outer end and supporting the grain-wheel, a second arm extending forward from said rock-shaft at or toward its inner end, and a connection between said second or lever arm and adjusting mechanism upon the wheel-frame, whereby the rock-shaft may be oscillated to raise and lower the platform.

2. The combination, substantially as hereinbefore set forth, of the main axle, the drive-wheel mounted thereon, the main or wheel frame mounted on the axle, the rock-shaft journaled in the rear end of the main frame and supporting the platform, a grain wheel or caster carried by a rearwardly-extending arm at the outer end of said rock-shaft, a forwardly-extending lever-arm at or toward the inner end of said shaft, a draft-tongue hinged to the front of the main frame and extending rearwardly from the pivotal point, a bracket-casting or other means of attachment on the heel of said draft-tongue, and connections between said bracket, said lever-arm, and a common controlling instrumentality, whereby the rock-shaft may be oscillated in its bearings and the draft-tongue simultaneously flexed upon its pivot in such relation as to raise the platform, preserving its parallelism.

3. The combination, substantially as hereinbefore set forth, of the main axle, the drive-wheel mounted thereon, the main frame mounted on the axle, a rock-shaft journaled in the rear end of the main frame and supporting the platform, a grain wheel or caster carried by a rearwardly-extending arm at the outer end of said rock-shaft a forwardly-extending lever-arm at or toward the inner end of said shaft, a draft-tongue hinged to the front of the main frame and extending rearwardly from the pivotal point, a bracket-casting or other means of attachment on the heel of said draft-tongue, chains extending from said bracket and from said lever-arm to properly-proportioned pulleys or winding-drums upon the main frame, and mechanism for rotating said pulleys to wind up or let out said chains, and thereby raise or lower the harvester-platform.

4. The combination, substantially as hereinbefore set forth, of the main axle, the drive or carrying wheel mounted thereon, a main frame sleeved upon the axle inside the carrying-wheel, a platform hinged to the main frame at its rear end, a draft-tongue hinged to said frame at its front end in advance of its connection with the axle, means for simultaneously changing the angle between draft-tongue and main frame and platform and main frame, to raise and lower said platform, a seat and its support sleeved to the axle outside of the drive-wheel, and a brace-rod extending from said seat to an adjustable connection with the tongue or a foot-rest offset therefrom.

5. The combination, substantially as hereinbefore set forth, of the main axle, the drive or carrying wheel mounted thereon, the main frame mounted on the axle, a rock-shaft borne in bearings at the rear end of the main frame, a grain-wheel mounted upon a rearwardly-extending arm from the outer end of said rock-shaft, a forwardly-extending lever-arm at or toward the inner end of said rock-shaft, a draft-tongue pivoted to said main frame in advance of the axle and extending rearwardly between guide-ears, which permit it to play in a vertical plane, and connections between the heel end of said draft-tongue, the free end of the lever-arm, and a common controlling instrumentality, by which the draft-tongue can be vibrated upon its pivot and the rock-shaft simultaneously oscillated in its bearings, to change the angle between the draft-tongue and frame and the platform and frame, and raise and lower said platform.

6. The combination, substantially as hereinbefore set forth, of the main axle, the drive or carrying wheel mounted thereon, the main frame mounted on the axle, a rock-shaft mounted in bearings at the rear end of the frame, and having at its outer end a rearwardly-extending arm to support the grain-wheel, and at its inner end or length a forwardly-extending lever-arm, a platform supported upon said rock-shaft as a journal or axle, a tongue hinged to the main frame in advance of the main axle, and extending rearwardly from said pivot to vertical guides or keepers, between which its heel end plays and is steadied, a bracket-casting secured to said heel end, a worm-shaft extending down from about the height of the seat and turning in bearings upon the main frame, a crank at the upper end of said shaft to be operated by the driver, a worm-pinion meshing with the worm at the lower end of said shaft, and turning on a stub-axle projecting from the main frame, and properly-proportioned winding-drums fixed to said pinion to turn therewith, one receiving a chain from the bracket-arm at the rear of the tongue, and the other a chain from the lever-arm extending forwardly from the rock-shaft.

7. The combination, substantially as hereinbefore set forth, of the main axle, the drive-wheel turning loosely thereon, a clutch between said drive-wheel and axle, a main frame sleeved to the axle, a beveled gear-wheel pinned to the axle within said main frame, a platform hinged to the rear end of the main frame and carrying a transverse driving-shaft, a shaft geared with the beveled wheel by means of a beveled pinion, and extending rearwardly through the main frame to a universal-joint connection with the platform-shaft, and means for raising and lowering said platform.

8. The combination, substantially as hereinbefore set forth, of the main axle, the drive-wheel turning loosely thereon, the clutch between the wheel and axle, the main frame sleeved to the axle on the inner side of the drive-wheel, the rock-shaft mounted in bearings at the rear end of the main frame, and carrying in a crank-arm at its outer end the grain-wheel, and oscillated by means of a lever-arm at its inner end, and controlling mechanism on the main frame, the platform journaled on said rock-shaft and carrying the transverse driving-shaft, the cutter crank-shaft parallel to and gearing with said driving-shaft, the beveled gear pinned or keyed to the main axle, the prime pinion with which it meshes, and the telescoping shaft extending rearwardly from said prime pinion through the main frame to a universal-joint connection with the platform driving-shaft, above or near the axis of said platform.

9. The combination, substantially as hereinbefore set forth, of the main axle, the drive-wheel mounted thereon, the main frame mounted on the axle, the rock-shaft having its bearings in the rear end of said main frame, and supporting, by means of a crank-arm at its outer end, the grain-wheel, the forwardly-extending lever-arm from said rock-shaft, a chain-connection between said lever-arm and a winding-drum on the main frame, a worm-pinion fast to said drum, and a worm-shaft controlled by the driver and meshing with said pinion, whereby the rock-shaft can be oscillated in its bearings to raise or lower the platform.

10. The combination, substantially as hereinbefore set forth, of the main axle, the drive-wheel mounted thereon, the main frame mounted on the axle, the platform hinged to the rear end of said main frame, the draft-tongue hinged to forwardly-extending arms on said frame, and steadied in rear of the pivotal point by vertical keepers, a chain-connection between the heel end of the draft-tongue and a winding-drum upon the frame, a worm-wheel fast to said winding-drum, and a worm-shaft meshing with said wheel, whereby it may be revolved by the driver, to cause the drum to take up or let out the chain and alter the angle of the draft-tongue to the frame.

11. The combination, substantially as hereinbefore set forth, of the main axle, the drive-wheel or carrying-wheel turning on said axle, the main frame sleeved upon the axle inside of the drive-wheel and abutting against its hub to support it against lateral displacement on that side, a tube or sleeve pinned to the axle on the outer side and abutting against the hub of the wheel on that side, to prevent its lateral displacement in such direction, and a sliding clutch-half feathered to said sleeve, and engaging with a clutch-face formed on the opposing hub, to clutch the wheel to the axle.

12. The combination, substantially as hereinbefore set forth, of the main axle, the drive or carrying wheel turning thereon, the main frame sleeved upon the axle on the inner side of said wheel and abutting against its hub on that side, a tube or sleeve pinned to the axle on the outer side of the wheel, and also abutting against the hub on that side, whereby the axle is secured against lateral displacement, a seat-support mounted upon the axle outside of said tube, and a seat carried thereon, a sliding clutch-half feathered to the sleeve inside of the seat-support and engaging with a clutch-face formed in the opposing wheel-hub, a standard projecting from the seat-support, and a clutch-lever pivoted to said standard, to operate the sliding clutch-half.

13. The combination, substantially as hereinbefore set forth, of the main axle, the drive or carrying wheel turning thereon, the main frame sleeved upon the axle on the inner side of said wheel and abutting against its hub on that side, a sleeve pinned to the axle on the outer side of the wheel, and also abutting against the hub on that side, whereby the axle is steadied against lateral displacement, a seat-support mounted upon the axle outside of said sleeve, and a seat carried thereon, a sliding clutch-half feathered to the sleeve inside of the seat-support and engaging with a clutch-face formed in the opposing wheel-hub, a standard projecting from the seat-support and formed with an inclined face, and the clutch-lever pivoted to said standard by a spring-seated bolt, and having on its shank a projection to travel over said incline and snap behind the edge of the standard, to lock the clutch-half out of engagement.

14. The combination, substantially as hereinbefore set forth, of the main axle, the drive or carrying wheel mounted thereon, the main frame mounted on the axle, the cranked rock-shaft mounted in bearings at the rear end of said frame and supporting the grain-wheel, the lever-arm from said rock-shaft, the platform mounted upon the rock-shaft as a bearing, the standard on the platform, the draft-tongue pivoted to the frame in advance of the axle and extending rearwardly from the pivotal point, connections between the lever-arm, draft-tongue, and a common controlling device, whereby said lever and draft-tongue may be simultaneously moved to change their angles with the frame and raise the platform, a lever pivoted to the draft-tongue, a segment-rack for said lever, and a link connecting the lever with the standard upon the platform, whereby said platform may be tipped and secured in the tipping adjustment.

15. The combination, substantially as hereinbefore set forth, of the main axle, the drive or carrying wheel mounted thereon, the main frame mounted on the axle, the rock-shaft mounted in bearings at the rear end of the frame and supporting the grain-wheel by a cranked arm at its outer end, a lever-arm from said rock-shaft, connected with mechanism whereby it may be vibrated to oscillate the rock-shaft, a platform mounted upon said rock-shaft as a journal or axle, and adjusted vertically as it oscillates, and means whereby said platform may be tipped and secured in any tipping adjustment independently of its vertical adjustment.

16. The cast main frame formed, substantially as described, in a single integral piece, with sleeves or bearings for the main axle, rearwardly-extending arms for the platform-connection, forwardly-extending arms for the draft-tongue connection, and vertical guides for the heel end of said tongue.

17. The main frame formed, substantially as hereinbefore described, in a single integral piece, comprising sleeves or bearings for the main axle, an arm extending rearwardly at practically right angles to said bearings, a second arm extending rearwardly at an oblique angle to said bearings to serve as a brace, a cross-arm between the two, a forwardly-extending arm at right angles to the bearings, and another forwardly-extending arm at an oblique angle, to receive the pivot-bolt of the tongue, embrace the tongue between them, and serve as hounds, vertical guides for the rear end of the tongue, and a web and ears for the attachment of the adjusting devices.

SYLVANUS D. LOCKE.

Witnesses:
WM. H. BATES,
WM. A. SKINKLE.